Sept. 4, 1951  R. E. DIETERICH  2,566,934
COMBINED VEHICLE WINDSHIELD SHADE AND
TRAFFIC SIGNAL FINDER
Filed July 6, 1949  2 Sheets-Sheet 1
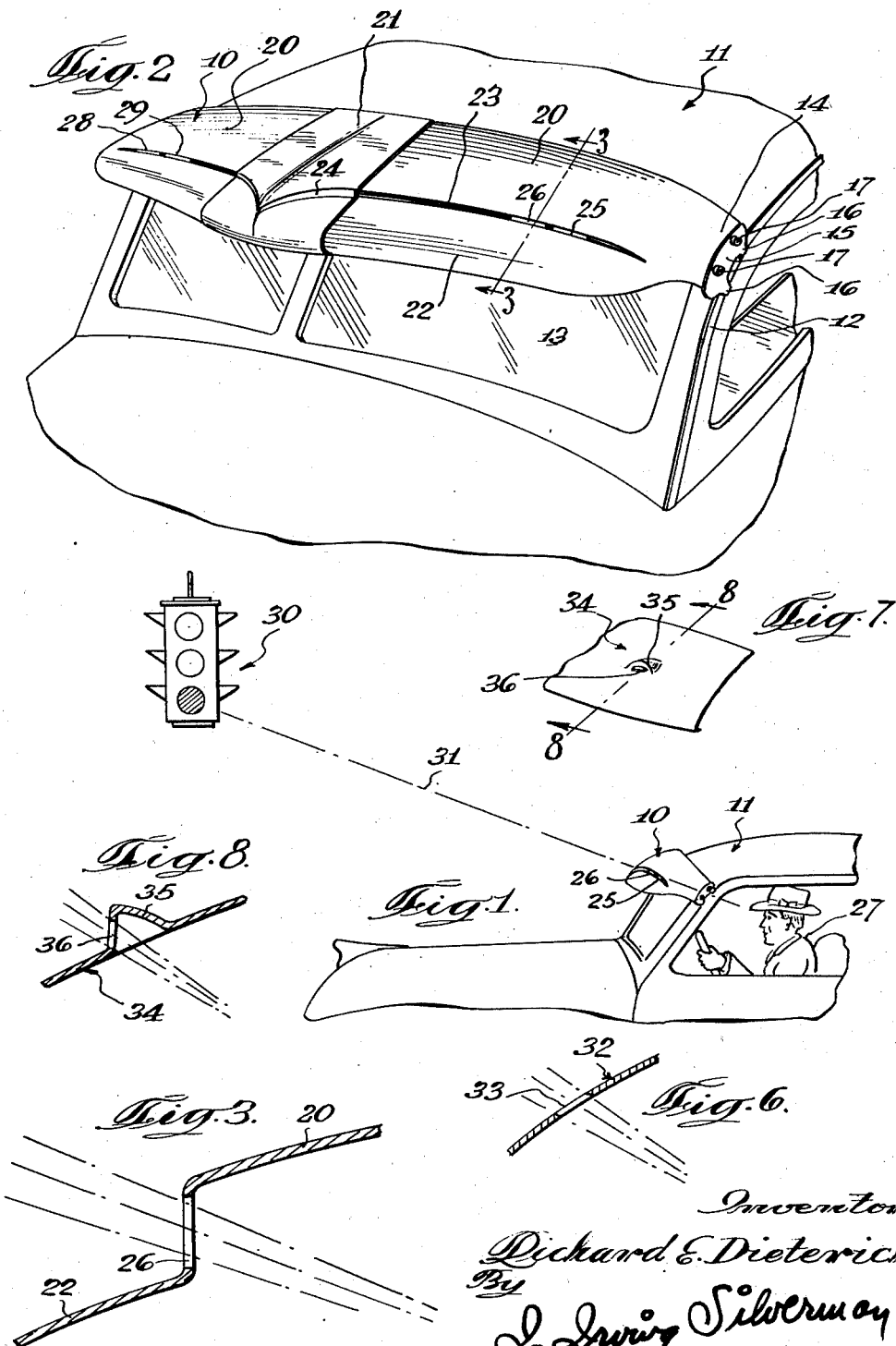

Sept. 4, 1951  R. E. DIETERICH  2,566,934
COMBINED VEHICLE WINDSHIELD SHADE AND
TRAFFIC SIGNAL FINDER
Filed July 6, 1949  2 Sheets-Sheet 2
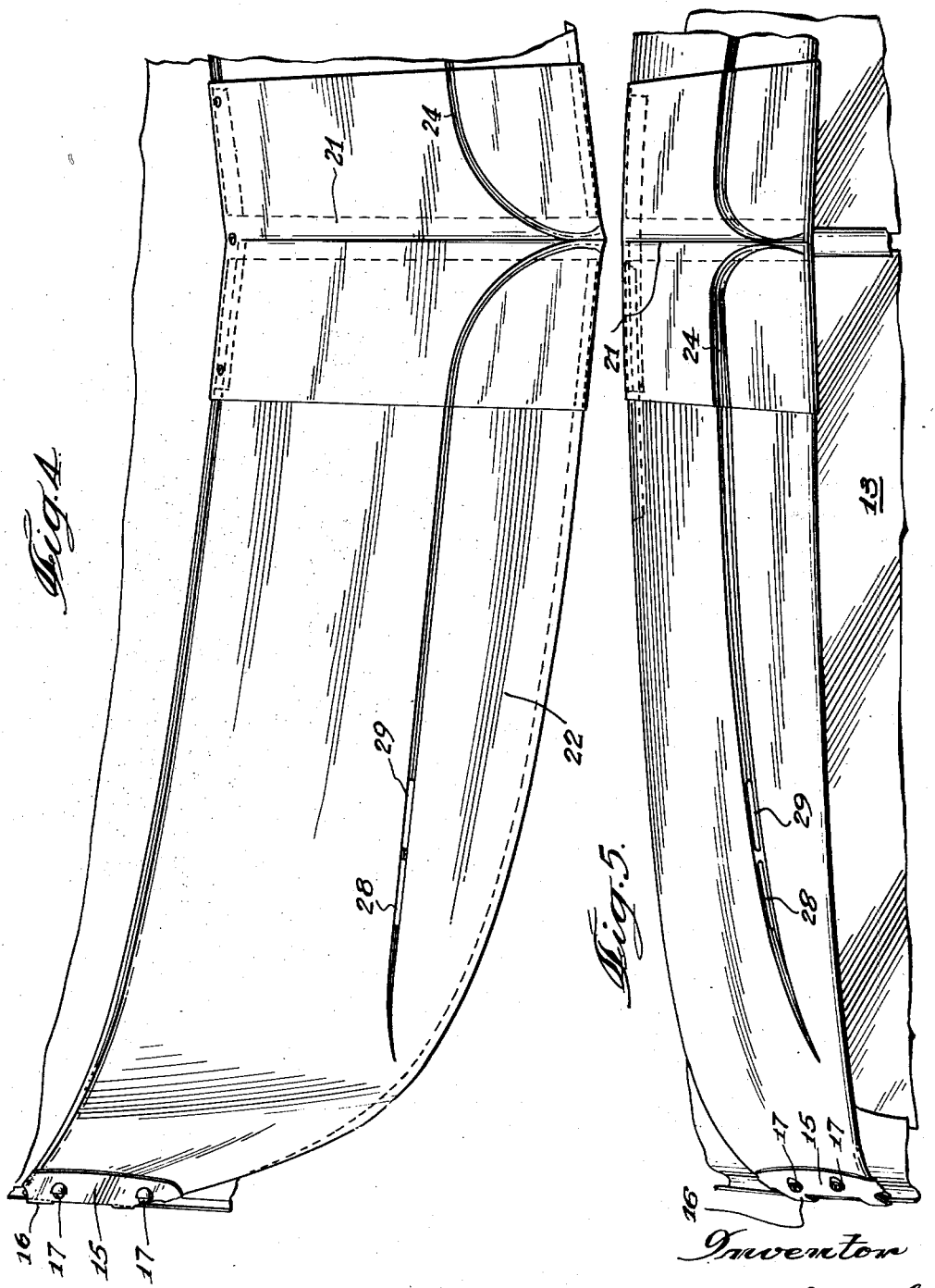

Patented Sept. 4, 1951

2,566,934

UNITED STATES PATENT OFFICE 2,566,934

COMBINED VEHICLE WINDSHIELD SHADE AND TRAFFIC SIGNAL FINDER

Richard E. Dieterich, River Forest, Ill.

Application July 6, 1949, Serial No. 103,313

3 Claims. (Cl. 296—95)

This invention relates to an exterior automobile windshield shade adapted to be secured to the front end of a vehicle to shade the occupants thereof from the sun, road glare, and to minimize the amount of rain, snow, or other precipitation either impinging against the windshield during travel, or accumulating thereon while the vehicle is not moving. Particularly the invention resides in the provision of a vehicle windshield shade which has combined therewith a traffic signal finder.

The benefits of a vehicle windshield shade are too well known to require other than a cursory discussion. It is well known, for example that the shading of the windshield keeps the interior of the vehicle cool; that fatigue and eyestrain caused by glare are reduced; that many other advantages accrue through the use of such a visor or shade. However, there are certain disadvantages which are based upon the decrease in the vertical visual angle subtended by the driver's eyes and bounded on the bottom by the hood of the vehicle, and on the top by the leading edge of the visor. Normally the "upper" vision is not necessary, since the visor is installed for the greatest possible vertical angle available without discomfort. There are times, however, when vision above the visor is required. This occurs when a traffic signal close at hand must be observed. Especially in locations where the signal is overhead, the driver, in the case of opaque visors heretofore produced, could not see the traffic signal. Other similar situations involving the "upper" vision have arisen, but not with as much frequency.

Previous attempts have been made to alleviate this great disadvantage by the provision of traffic signal finders adapted to be secured to the windshield, and taking the form of prismatic lenses or reflectors. Not only has this necessitated the purchase of an additional item, but as well, said item had to be installed and adjusted and was an obstruction to normal straightforward vision. In addition, the field of these traffic signal finders was extremely limited and the driver could not find the signal therein only by moving his head around a great deal. In the daytime, it was often practically impossible to find the signal in certain situations.

The principal object of the invention is to eliminate and abolish all of the above set forth disadvantages by providing a combined signal finder and visor which requires no prisms, in which the finder is a part of the visor itself, which utilizes no lenses or mirrors and which increases the cost of producing the visor only a few cents, if at all.

Further objects of the invention are: to provide a vehicle windshield shade or visor which includes a traffic signal finder which is not perceptible by observers and which thus does not detract from the appearance of the vehicle; to provide a visor and finder of the character described which will not obstruct straightforward view of the driver; to provide a visor having a traffic finder of the character described which, despite its extreme simplicity and economy will function more efficiently than previous finders.

Another object of the invention is to provide a direct view traffic finder.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a fragmentary side elevational view of an automobile having my new automobile visor installed thereon and showing the manner in which a traffic signal is viewed by the driver through the traffic signal finder of my invention.

Fig. 2 is a perspective view of the visor installed upon an automobile shown on a slightly enlarged scale.

Fig. 3 is a sectional view on a greatly exaggerated scale taken through the traffic finder slit of my new visor, generally along the line 3—3 of Fig. 2 and in the indicated direction.

Fig. 4 is a fragmentary top plan view of the visor.

Fig. 5 is a fragmentary front elevational view of the visor.

Fig. 6 is a view similar to that of Fig. 3 but taken through a modified form of the invention.

Fig. 7 is a fragmentary perspective view of a visor having a further modification.

Fig. 8 is a sectional view along the line 8—8 of Fig. 7 and in the indicated direction.

Referring now to the figures, the reference character 10 is used generally to designate my new visor. Same is shown as a separate accessory intended removably to be secured to the automobile 11 by clamping the ends of the same to the gutters 12 which are arranged alongside the windshield 13. For this purpose the ends 14 of the visor 10 are provided with clamping members 15 having ears 16 which engage beneath the gutters 12, the members 15 being held to the ends 14 by bolts. The particular form of clamping expedient consists of arranging the free lips of the ends 14 to engage inside the gutters 12 while the clamping members 15 engage the outside of the gutters to sandwich the gutters 12 therebetween holding the visor 10 in place. This is best shown in Figs. 4 and 5.

It is desired to point out that the detailed explanation of the manner of attachment is only for illustrative purposes. My invention can be utilized with the construction of an automobile visor which is permanently secured to the automobile as a part thereof, produced by the automobile manufacturer and secured to the front of the automobile while the same is being assembled. Likewise my invention is applicable to any kind of visor which may be screwed, welded, riveted, clamped, or in any other way attached to the front end of the automobile.

The visor 10 is formed of right and left panel sections identical in construction and shape, but opposite in arrangement. Both panels are hence designated 20. Said panels 20 may be secured together in any desired manner at the center of the visor 10, and may have a central ornamental medallion 21 overlying the joint. The medallion 21 may either be a coupling member helping to secure the panels 20 together, or may even be an integral part of the visor 10 itself, that is, may merely be an upset protuberance in case the entire visor 10 is stamped or otherwise formed from a single piece of metal. The medallion 21 may even be eliminated in case the entire visor 20 is intended to present a smooth appearance.

In my visor, the panels 20 are suitably curved and cambered to match the general streamlined contours of the modern automobile, and each panel has a front section 22 integrally formed therewith extending substantially along the entire length of the respective panel. Each of said front sections is offset on a level slightly below its respective panel 20 by means of a step 23 which also extends substantially the entire length of each of the respective panels 20. For decorative purposes, the medallion 21 may have matching trim lines or steps 24 which artistically blend with the inner ends of the steps 23.

The step 23 on the left side of the automobile 11 is provided with slits 25 and 26 which because of the step 23 present vertical windows to the eyes of the driver shown seated at 27. Similar slits 28 and 29 may be provided in the right hand step 23 for the convenience of a front seat passenger, or for the driver in the case of right hand drive automobiles. The construction of the slits on both sides of the visor is the same as shown in Fig. 3. Through the windows formed by these slits 25, 26, 28, and 29 the driver 27 or other occupants of the car 11 are enabled to observe traffic signals 30 along the line of sight indicated at 31.

By slight movement of the driver's head he can adjust his view to practically any possible position of a traffic signal. The driver can even utilize the opposite slits. For example, driver 27 could turn to his right and look through the windows formed by the slits 28 and 29 to see traffic signals or other necessary items which are in the "upper" vision and to the right of the automobile 11.

Certain constructional details set forth herein are not of importance to the main concept of my invention. Thus, the slits 25, 26, 27, and 28 need not be shaped as shown; need not be arranged in pairs as shown; and need not be perfectly vertical nor formed on a step 23 as shown. Fig. 6 shows a sectional view through a visor 32 which has no step and in which there is a window 33 of any suitable shape formed in the said visor.

I have found that the narrow strip of projected light formed on the inside of the automobile by reason of the slits is insignificant and without any deleterious effects and eventually is so completely ignored by the occupants of the automobile that it is forgotten.

In Figs. 7 and 8 there is shown another form which the visor and windows may take. In this construction the visor 34 has no step but instead there is a protuberance 35 which may be stamped from the same member forming the visor panel having the window 36 formed in the forward side of the protuberance 35. The protuberance 35 may even be formed separately from the visor 34 which may have a space cut out for the reception thereof, and in assembly the protuberance may be riveted or welded to the panel of the visor 34.

It is believed that this invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of this invention as defined in the appended claims.

What is claimed and desired to be secured by Letters Patent of the United States is:

1. In a visor of the character described which has an opaque panel member arranged in shading relationship to the windshield of an automobile, a traffic signal finder which comprises a series of narrow slits arranged end to end in a single line in the visor panel across the line of vision of the driver, and being of such vertical dimension as to permit only a narrow slit of light to enter into the automobile, while permitting the driver to encompass a substantial area by looking out therethrough.

2. In a combined automobile windshield visor and traffic signal finder which includes an elongate panel arranged to provide shading for the occupants of the automobile, said visor being imperforate throughout its extent with the exception of substantially unobservable narrow slit means in the panel in line with the forward sight of the driver formed only along a line extending substantially parallel with the said panel and providing constant traffic signal finding view to the driver without admitting substantially any light to the interior of the automobile.

3. In a combined automobile windshield visor and traffic signal finder which includes an elongate panel arranged to provide shading for the occupants of the automobile, said visor being provided with front and rear portions connected by a single narrow step extending substantially parallel with the visor and positioned in the line of the driver's vision, substantially unobservable narrow slit means formed in said step, said front portion of said step being downwardly offset relative to the rear portion, said step serving to camouflage said slit means.

RICHARD E. DIETERICH.

REFERENCES CITED

The following references are of record in the file of this patent:

UNITED STATES PATENTS

| Number | Name | Date |
|---|---|---|
| 1,735,177 | Pearce | Nov. 12, 1929 |
| 1,745,197 | Tirpak | Jan. 28, 1930 |